(12) United States Patent
McDonnell

(10) Patent No.: US 6,940,816 B2
(45) Date of Patent: Sep. 6, 2005

(54) METHOD AND APPARATUS FOR A SLOT-BASED MEMORY CONTROLLER

(75) Inventor: David J. McDonnell, Fair Oaks, CA (US)

(73) Assignee: Intel Corporation, Santa Clara, CA (US)

(*) Notice: Subject to any disclaimer, the term of this patent is extended or adjusted under 35 U.S.C. 154(b) by 310 days.

(21) Appl. No.: 09/752,371

(22) Filed: Dec. 29, 2000

(65) Prior Publication Data

US 2002/0085573 A1 Jul. 4, 2002

(51) Int. Cl.[7] .............................................. G01R 31/08
(52) U.S. Cl. ........................ 370/235; 710/54; 713/503
(58) Field of Search ............................... 710/54, 52, 6, 710/39, 56, 58, 60; 713/502, 400, 401, 600, 500, 503, 412; 714/718; 340/825.2; 711/170, 167, 171, 137; 370/235, 412

(56) References Cited

U.S. PATENT DOCUMENTS

| | | | |
|---|---|---|---|
| 5,778,435 A | * 7/1998 | Berenbaum et al. | 711/137 |
| 5,873,119 A | 2/1999 | Khandekar et al. | |
| 6,088,774 A | * 7/2000 | Gillingham | 711/167 |
| 6,154,821 A | * 11/2000 | Barth et al. | 711/170 |
| 6,182,254 B1 | * 1/2001 | Bae | 714/718 |
| 6,226,729 B1 | * 5/2001 | Stevens et al. | 711/171 |
| 6,381,658 B1 | * 4/2002 | Swaminathan | 710/54 |
| 6,408,398 B1 | * 6/2002 | Freker et al. | 713/500 |
| 6,564,335 B1 | * 5/2003 | Freker | 713/600 |

FOREIGN PATENT DOCUMENTS

WO    WO 00/26744 A    5/2000

OTHER PUBLICATIONS

"Intel® 840 Chipset: 82840 Memory Controller Hub (MCH) Datasheet", Sep. 2000, Retrieved from the Internet: URL: ftp://download.intel.com/design/chipsets/datashts/29802002.pdf.

PCT International Search Report, PCT/US01/50659, Apr. 8, 2003.

PCT Written Opinion, PCT/US01/50659, mailed Nov. 24, 2004.

* cited by examiner

*Primary Examiner*—Duc Ho
*Assistant Examiner*—Phuongchau Ba Nguyen
(74) *Attorney, Agent, or Firm*—Blakely, Sokoloff, Taylor & Zafman LLP (57) ABSTRACT

A memory controller is disclosed. The memory controller includes a slot-based controller adaptable to launch a packet that straddles a first fixed packet slot and a second fixed packet slot.

25 Claims, 11 Drawing Sheets

METHOD AND APPARATUS FOR A SLOT-BASED MEMORY CONTROLLER

FIELD OF THE INVENTION

The present invention relates to memory systems; more particularly, the present invention relates to reducing the idle memory read leadoff latency of a slot-based memory controller.

BACKGROUND

A Rambus Dynamic RAM (RDRAM) developed by Rambus, Inc., of Mountain View, Calif., is a type of memory that permits data transfer operations at speeds up to 1.2–1.6 gigabytes per second. RDRAM devices are typically housed in Rambus in-line memory modules (RIMMs) that are coupled to one or more Rambus channels. Typically, the expansion channels couple each RDRAM device to a memory controller. The memory controller enables other devices, such as a Central Processing Unit (CPU), to access the RDRAMs.

In some systems, the memory controller is implemented using a slot-based architecture. A slot-based memory controller reduces the complexity of RAMBUS data packet scheduling between the memory controller and RDRAM devices by fixing scheduling granularity to the width of a Rambus control packet. Thus, a slot-based architecture enables constraints of packets to be simplified while relaxing less performance critical packet constraints.

In order to achieve predictable, controlled packet scheduling, the clock for a Rambus Asic Cell (RAC) (or rclk) within the memory controller is used to time packet transmissions. However, the memory controller usually operates within a memory controller clock domain (mclk). The mclk domain is typically phase-locked to the rclk via an external feedback loop. One component of the feedback loop is a synchronous clock (synclk) that synchronizes rclk with mclk. Accordingly, the process of receiving a memory request and then transmitting corresponding initial control packets onto Rambus involves a controlled clock crossing between mclk and rclk using synclk. However, unless mclk is the same frequency as synclk, packet leadoff latency from an initially sampled memory request may be affected by the clock crossing. Therefore, a mechanism for reducing idle memory leadoff latency is desired.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus for reducing idle memory read latency in a memory controller is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
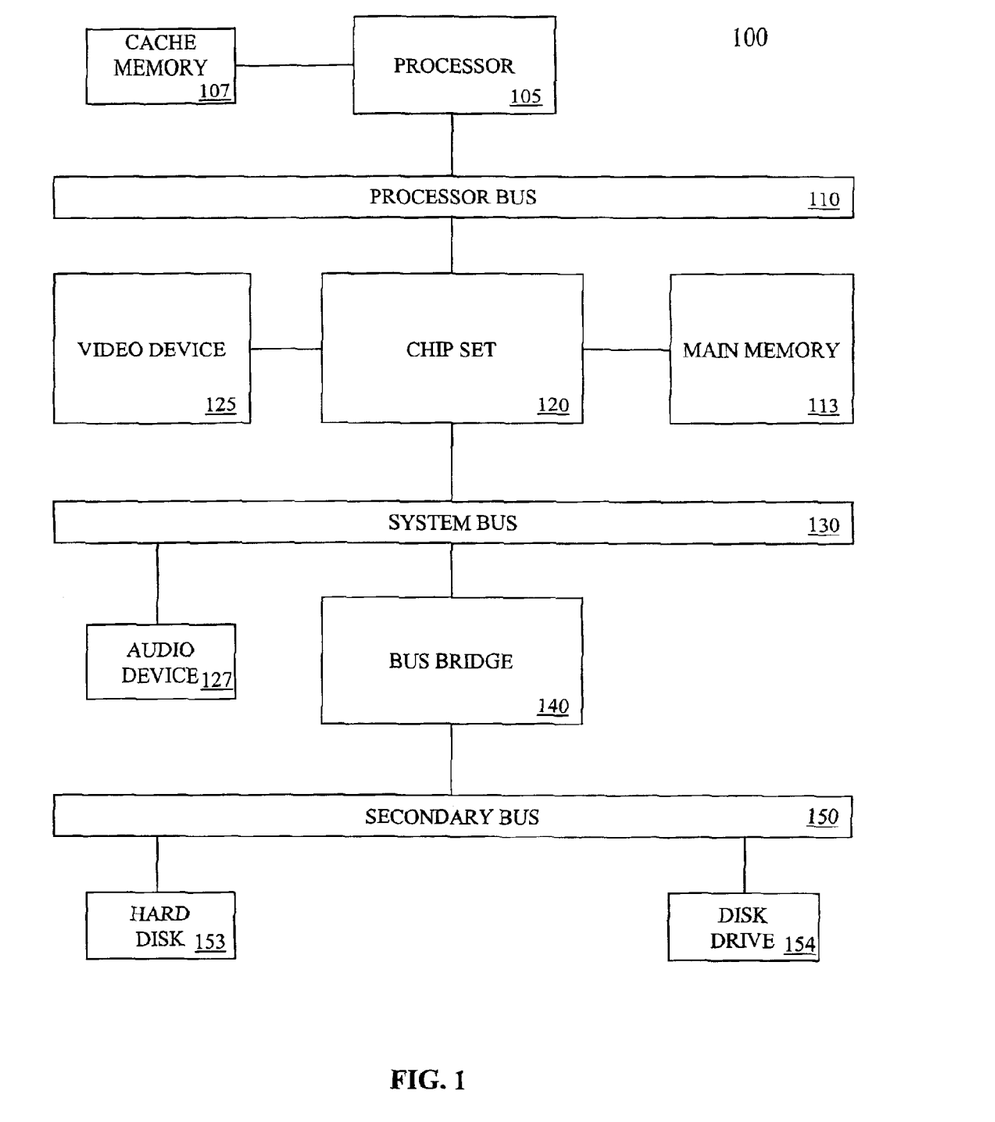
FIG. 1 is a block diagram of one embodiment of a computer system.

FIG. 1 is a block diagram of one embodiment of a computer system 100. Computer system 100 includes a central processing unit (processor) 105 coupled to processor bus 10. In one embodiment, processor 105 is a processor in the Pentium® family of processors including the Pentium® II family and mobile Pentium® and Pentium® II processors available from Intel Corporation of Santa Clara, Calif. Alternatively, other processors may be used. Processor 105 may include a first level (L1) cache memory (not shown in FIG. 1).

In one embodiment, processor 105 is also coupled to cache memory 107, which is a second level (L2) cache memory, via dedicated cache bus 102. The L1 and L2 cache memories can also be integrated into a single device. Alternatively, cache memory 107 may be coupled to processor 105 by a shared bus. Cache memory 107 is optional and is not required for computer system 100.

Chip set 120 is also coupled to processor bus 110. In one embodiment, chip set 120 is the 820 chip set available from Intel Corporation; however, other chip sets can also be used. Chip set 120 may include a memory controller for controlling a main memory 113. Further, chip set 120 may be coupled to a video device 125 that handles video data requests to access main memory 113. In one embodiment, video device 125 includes a video monitor such as a cathode ray tube (CRT) or liquid crystal display (LCD) and necessary support circuitry.

Main memory 113 is coupled to processor bus 110 through chip set 120. Main memory 113 and cache memory 107 store sequences of instructions that are executed by processor 105. In one embodiment, main memory 113 includes a Rambus dynamic random access memory (RDRAM) system; however, main memory 113 may have other configurations. The sequences of instructions executed by processor 105 may be retrieved from main memory 113, cache memory 107, or any other storage device. Additional devices may also be coupled to processor bus 110, such as multiple processors and/or multiple main memory devices. Computer system 100 is described in terms of a single processor; however, multiple processors can be coupled to processor bus 110.

Processor bus 110 is coupled to system bus 130 by chip set 120. In one embodiment, system bus 130 is a Peripheral Component Interconnect (PCI) bus adhering to a Specification Revision 2.1 bus developed by the PCI Special Interest Group of Portland, Oreg.; however, other bus standards may also be used. Multiple devices, such as audio device 127, maybe coupled to system bus 130.

Bus bridge 140 couples system bus 130 to secondary bus 150. In one embodiment, secondary bus 150 is an Industry Standard Architecture (ISA) Specification Revision 1.0a bus developed by International Business Machines of Armonk, N.Y. However, other bus standards may also be used, for example Extended Industry Standard Architecture (EISA) Specification Revision 3.12 developed by Compaq Computer, et al. Multiple devices, such as hard disk 153 and disk drive 154 may be coupled to secondary bus 150. Other devices, such as cursor control devices (not shown in FIG. 1), may be coupled to secondary bus 150.

Figure 2:
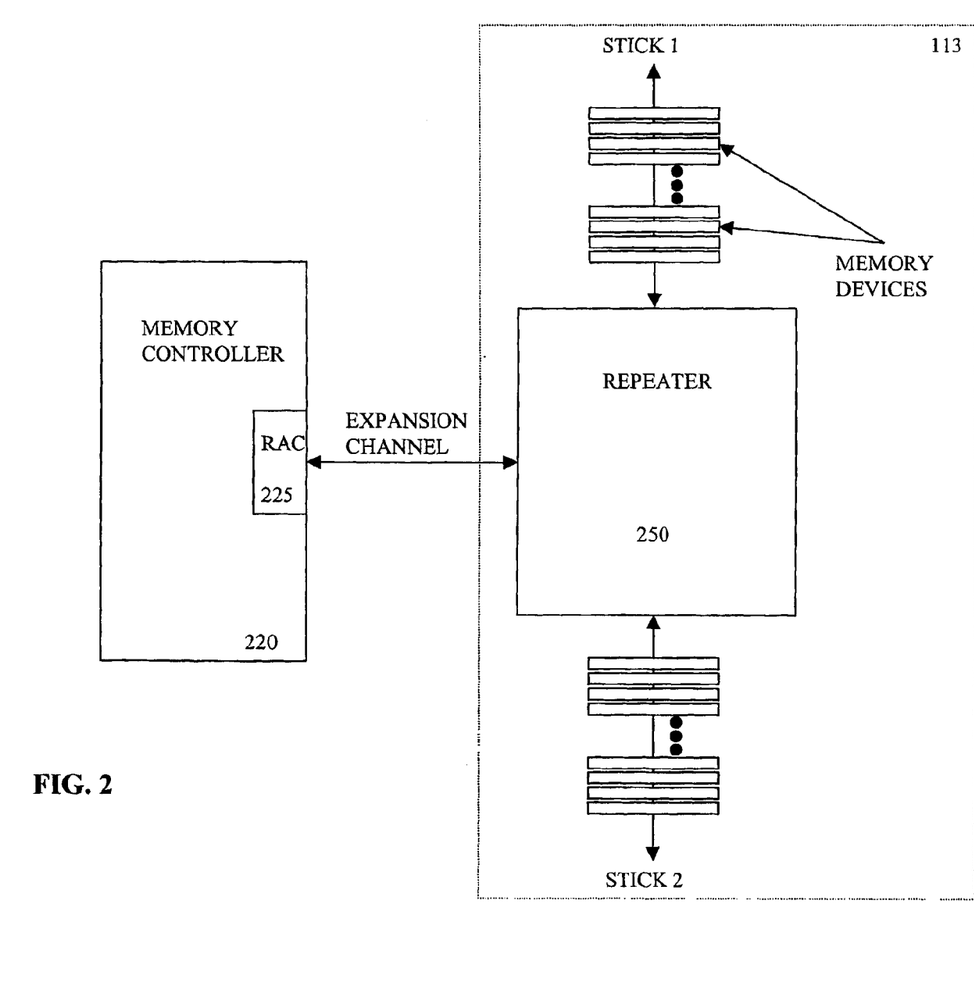
FIG. 2 is a block diagram of one embodiment of a memory controller coupled to main memory devices via a repeater.

FIG. 2 is a block diagram of one embodiment of a memory controller 220 coupled to main memory 113. Memory controller 220 includes a Rambus Asic Cell (RAC) 225. RAC 225 is used to interface to a high frequency expansion channel. The expansion channel may be driven at 400 MHz, and transfer data on the rising and falling edge of an expansion channel clock.

Main memory 113 includes repeater 250 coupled to memory controller 220 via the expansion channel. Repeater 250 is coupled to two stick channels (Stick 1 and Stick 2). Repeater 250 monitors the expansion channel for activity from memory controller 220 and repeats the activity on one or more of the stick channels. The stick channels coupled to repeater 250 function as an extension of the expansion channel. According to one embodiment, each stick channel includes 32 DRAM (or memory) devices that are included within one or more memory modules.

Alternatively, each stick channel may include other quantities of DRAM devices. Ordinarily, a maximum of 32 memory devices may be directly coupled to the expansion channel. Therefore, the stick channels coupled to repeater 250 permit up to 128 memory devices to be accessed by memory controller 220. Although one embodiment discloses a repeater coupled to RAC 225 via the expansion channel, one of ordinary skill in the art will appreciate that other embodiments may be implemented. For example, in another embodiment, the memory devices are coupled directly to the expansion channel. Thus, in such an embodiment, repeater 250 is not included.

According to one embodiment, memory controller 220 operates according to a modified slot-based architecture. A slot-based memory controller reduces the complexity of scheduling data packets between the memory controller 220 and a memory device on a stick channel by fixing scheduling granularity to the width of a Rambus control packet (e.g., four (4) clock cycles). Thus, a slot-based architecture enables constraints of packets to be simplified while relaxing less performance critical packet constraints.

In order to achieve predictable, controlled packet scheduling, the clock for RAC 225 (synclk) is used to time packet transmissions. Rclk is typically some fraction (e.g., ¼) of the clock frequency of memory controller 220 (mclk). For a given static timing configuration, the packet launch point with respect to the phase of the synclk is fixed. This is a function of implementing a fixed timing skew between PCP and SCP control packet types in order to meet minimum timing constraints, as well as physical chip delays incurred while transmitting packet contents between two clock domains. The fixed packet launch point with reference to the phase is typically referred to as packet shift.

As described above, memory controller 220 typically operates within a memory controller 220 clock domain corresponding to mclk, memory controller 220 is phase-locked to rclk via an external feedback loop using an intermediate synchronization clock (synclk) from the RAC. Thus, the process of receiving a memory request and then transmitting corresponding initial control packets onto Rambus involves a controlled clock crossing between the mclk and rclk. However, unless the mclk is the same frequency as the external control packet rate (typically synclk), packet leadoff latency from an initially sampled memory request is affected by the clock crossing. Therefore, a mclk:synclk frequency ratio of 2:1 and a synclk frequency of, for example 100 Mhz, imposes an average crossing delay of ¼ synclk or 2.5 ns in typical slot-based memory controller 220 systems.

Figure 3A:
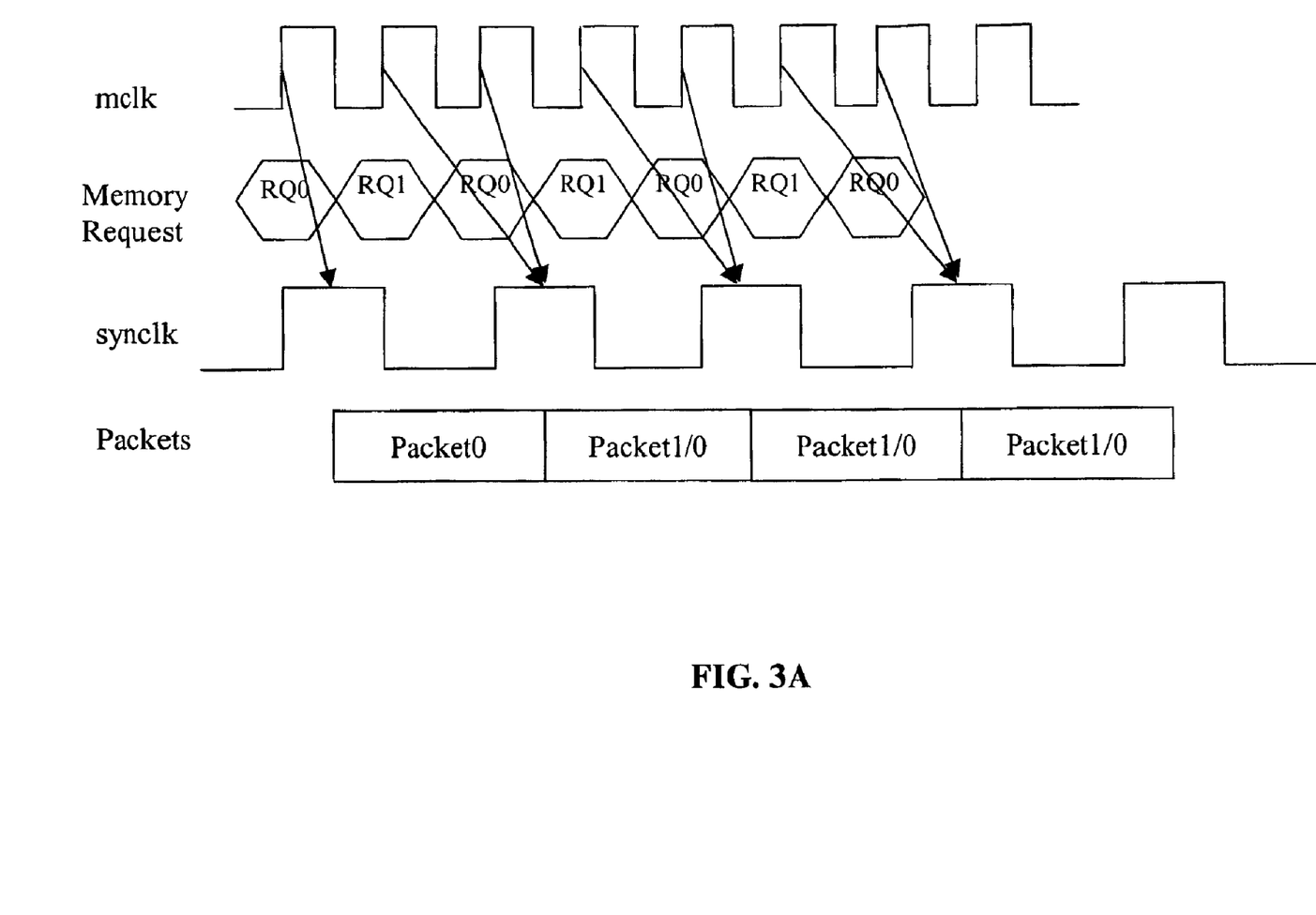
FIG. 3A is a timing diagram for an exemplary slot-based system.
Figure 3B:
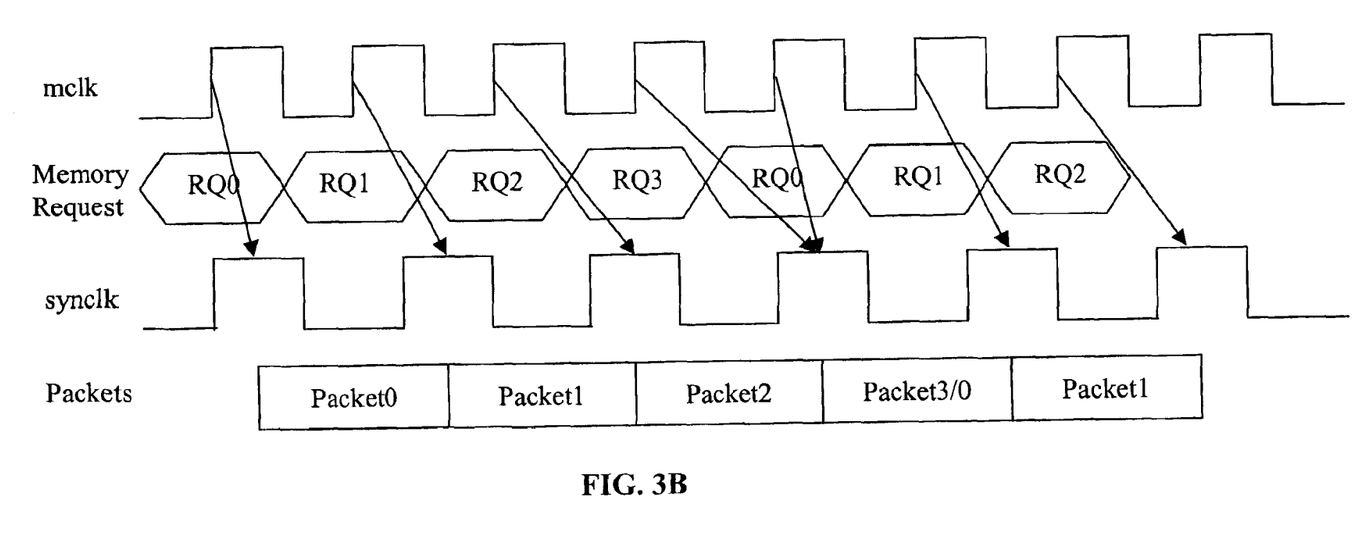
FIG. 3B is a timing diagram for an exemplary slot-based system.

FIG. 3A is a timing diagram for an exemplary slot-based system, wherein the ratio of mclk to synclk is 2:1. Due to the crossing delay between mclk and synclk, the second synclk is aligned to both the second and third mclks. As a result, an average IDLE crossing (or latency) delay of ½ synclk is incurred. Similarly, the third synclk is aligned to both the fourth and fifth mclks. FIG. 3B is a timing diagram for an exemplary slot-based system, wherein the ratio of mclk to synclk is 4:3. Similar to above, the fourth synclk is aligned to the fourth and fifth mclks.

Figure 4:
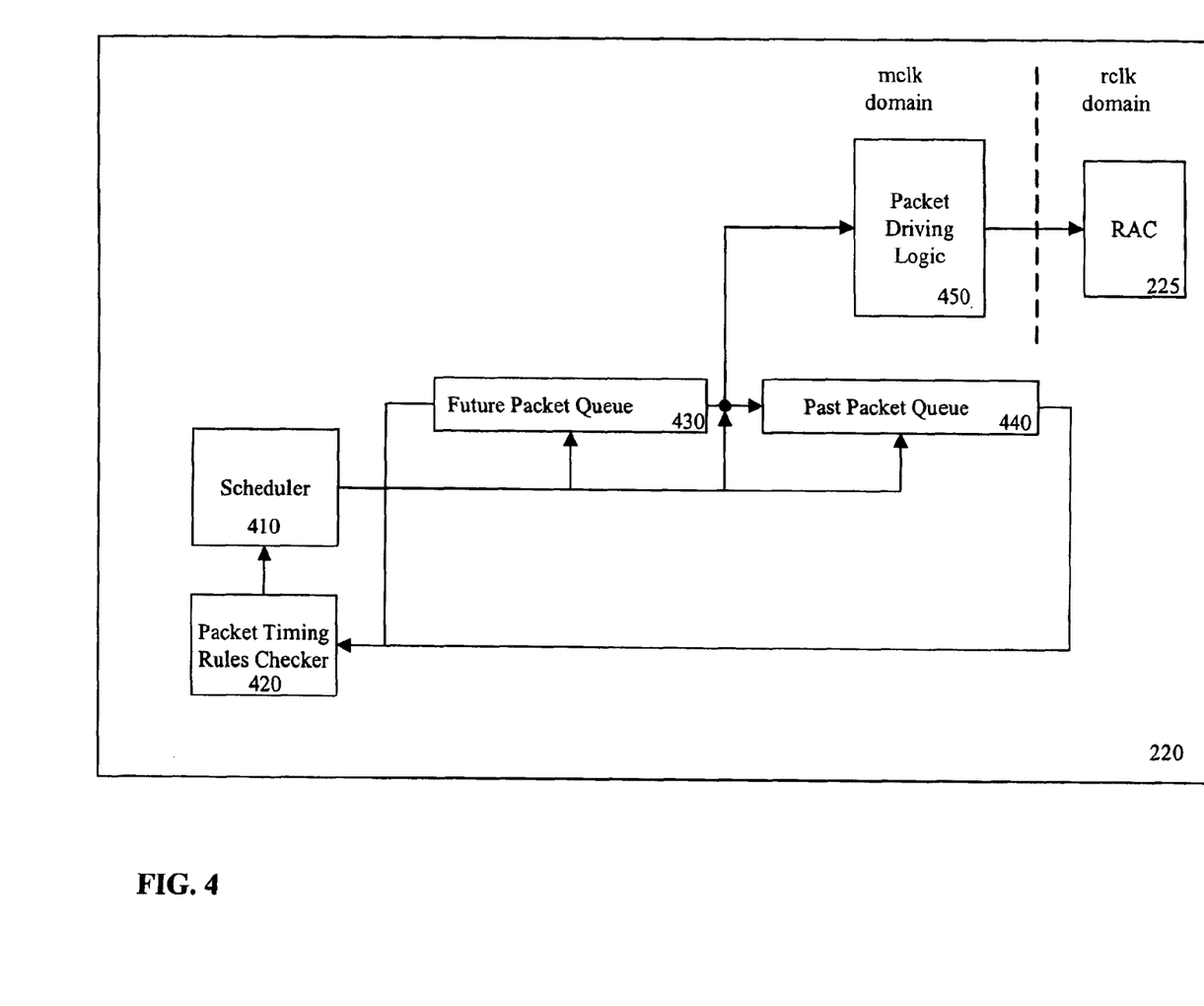
FIG. 4 is a block diagram of one embodiment of a memory controller.

According to one embodiment, the modified slot-based architecture of memory controller 220 reduces the average crossing delay that occurs in typical slot-based architectures. FIG. 4 is a block diagram of one embodiment of a slot-based controller within memory controller 220. Memory controller 220 includes a scheduler 410, a packet timing rules checker 420, a future packet queue 430, a past packet queue 440 and packet driving logic 450, in addition to RAC 225. Scheduler 410 is a slot-based scheduler that uses packet queues 430 and 440 to track past and future packets, respectively, with respect to a present time. According to one embodiment, scheduler 410 receives packets from a memory request arbiter (not shown) via a packet generator (not shown). Scheduler 410 can simultaneously insert one or more newly received packets into any available slot in future queue 430, or transmit live packets directly to packet driver logic 450.

Rules checker 420 performs timing checks between new request packets waiting to be scheduled and all of the packets in future queue 430 and past queue 440 concurrently. In addition, rules checker 420 informs scheduler 410 of non-violating available packet slots. According to one embodiment, packets are categorized as primary control packets (PCPs) and secondary control packets (SCPs) packets. PCPs correlate with SDRAM row type functionality commands. According to one embodiment, the packet info is encoded as a fixed 4 rclk serialized packet. SCPs correlate with SDRAM column type functionality commands. PCPs are also encoded as a fixed 4 rclk serialized packets. PCP and SCP packets form the high speed control bus from memory controller 220 towards the RDRAM.

According to one embodiment, future packet queue 430 and past packet queue 440 are large unidirectional shift registers. The queues are shifted to track time advance of packets as they are launched on the expansion channel. In a further embodiment, both queues enable all slots to be read simultaneously by rules checker 420. Future queue 430 has the additional capability to be parallel loaded in one or more of its slots simultaneously by scheduler 410. The function of future queue 430, as opposed to a single register, is to allow scheduler 410 to schedule multiple packets related to one or more operations simultaneously, thus optimizing future requests.

In one embodiment, all packets get launched from the top of future queue 430 into packet driver logic 450 for eventual transmission via the expansion channel. According to a further embodiment, other packets in future queue 430 are simultaneously advanced towards the top entry as the top packet in the queue is launched. Past queue 440 provides tracking ability for rules checker 450 to check packet timing constraints against recently launched packets. The required length of past queue 440 is dictated by the worst case timing constraint check for a packet which scheduler 410 may schedule in the head entry of the future queue, or the live launch of a packet by scheduler 410 into packet driver logic 450. Packet driver logic 450 includes circuitry that interfaces with the RAC 225. RAC 225 transmits the packets on to the expansion channel.

The slot-based controller positions packets in fixed slots with respect to a time reference. According to one embodiment, a packet is always one synclk long. Consequently, the time reference is a constant phase of synclk. Fixed slots simplify the rule checking since it is in terms of non-fractional synclks. Further, a packet's position in time relative to other packets is to be tracked for a minimal amount of time after it is launched on to the expansion channel in order to cover timing constraint rules within memory controller 220 and memory devices related to future packets.

The problem with fixed slots is that idle latency is not always optimal. To minimize latency to data in the case of a memory read request, the control packets should be launched immediately. Whenever memory controller 220 is being fully utilized, most control packet slots are occupied. Thus, there is a queue of memory requests waiting for packet launches and little opportunity for any packets to launch any quicker because the optimal packet slots have already been scheduled.

However, there may be an earlier slot that is empty but is partially launched or committed to the expansion channel. Conventional slot-based scheduling restricts packet launches to the slot's boundary (e.g., some fixed rclk cycle relative to a synclk phase reference). The appearance of a memory request may not be synchronous to these slot boundaries. In the case of a request appearing at memory controller 220 with an empty packet slot already committed, the next empty packet slot must be used. This increases latency to the eventual read data in the case of a read. If the unused portion of the committed slot can be used for the new packet, a latency reduction of two rclks is achievable.

According to one embodiment, the slot-based controller within memory controller 220 operates according to a modified slot-based sequence that reduces packet latency. The modified slot-based controller enables a packet being scheduled at the head of the future queue 430 (e.g., the next packet to launch on the expansion channel) to launch sooner by straddling two fixed packet slots in the case where the next closest, but committed packet slot, is empty. In terms of future queue 430 and past queue 440, this implies that the tail (or last) entry of past queue 440 is empty. A packet that launches in this manner becomes tagged with an attribute that indicates that it is straddling this slot and another. According to one embodiment, the attribute is an rclk offset that represents the skewed position of the packet relative to the fixed slots. For example, the actual packet position relative to the slot's position may be offset by one or more rclks (e.g., 400 MHz) relative to the start of the slot.

By allowing only a ½ synclk or ½ slot advance launch, only a single bit is needed to indicate this in the attribute fields of the slot. In one embodiment, only packets in past queue 440 can have this ½ slot forward skew indication since only packets at the head of future queue 430 can implement this process. In a further embodiment, a packet being launched early can be written into the past queue in both of the slots that the packet ends up straddling as if two back-to-back packets had been launched. Rules checker 420 uses past queue 440 entries to validate possible future slot choices for scheduler 410, and does not affect packets that are already scheduled. By having an early launched packet occupy both fixed slots in the queues it is straddling, no changes are necessary to rules checker 420 or scheduler 410 since it will still adhere to packet rules.

In a further embodiment, packets in future queue 430 that have already been scheduled will not advance a ½ slot when they reach the head of future queue 430 and become the next packet to launch. This situation does not occur since scheduler 410 has already chosen the most optimal slot for that packet. If there was an empty slot in front of a packet already scheduled in the queue (e.g., the requirement for a packet to advance), scheduler 410 would have placed the packet there if rules checker 420 had indicated that was a valid slot. Once a slot becomes scheduled and occupied by a packet, it will not be deleted (e.g., memory controller 220 will not try to reschedule a packet.) Therefore, an early launch may occur when an idle period has occurred between incoming memory requests at the input of memory controller 220 such that there are two back-to-back empty slots of which rules checker 420 has indicated either can be used to place the new leading packet for the memory request, and the leading empty packet slot of the pair has just been sampled by packet driver logic 450 with the trailing slot of the empty pair being at the head of the future queue.

If there was only one empty slot sampled by packet driver logic 450 and the next slot was occupied, then the next available slot for the incoming request's packets would be somewhere behind the already occupied slot at the head of the future queue. FIGS. 5A–5D illustrate an early launch, idle case sequence implemented by the modified slot-based controller.

The opportunity for early packet launch occurs because of differences in phase between the back-to-back packet rate on the expansion channel (e.g., synclk) and the launching opportunity rate of memory controller 220. The memory controller 220 launch opportunities typically occur once during every mclk clocking period. Typically, the frequency of mclk is greater than the frequency of synclk, and memory controller 220 can process packets faster than the back-to-back packet rate on the expansion channel. Since memory controller 220 is faster and not clocking at the same rate as the packet rate, additional mclks can occur during a beat period of both mclk and synclk wherein memory controller 220 is stalled.

In one embodiment, memory controller 220 recognizes this beat frequency relationship and will stall its packet presentations to packet driving logic 450 in order not to overwrite or overrun packets on the expansion channel. In a further embodiment, the number of self-stalls are tuned at memory controller 220 such that the average packet presentation rate by memory controller 220 matches the external rate. Memory controller 220 also stalls when fully idle (e.g., queues 430 and 440 are empty). As an example, memory controller 220 may operate at 200 Mhz, using a 400 Mhz Rambus. In this case, synclk=100 Mhz. Therefore, the ratio is 2:1, which is a non-fractional ratio. As a result, the beat period is one clock period of the lower frequency clock.

In this case the rising edge of mclk and synclk are aligned, with two mclk periods occurring for every synclk period. In the fixed slot-based controller, the launching of a packet is statically aligned to some quadrature phase of synclk. Thus, memory controller 220 in a 2:1 clocking mode will regularly stall every other mclk to match synclk rates. Memory requests can arrive at the input of memory controller 220 at any mclk. A request could arrive while memory controller 220 is stalling. If the arrival of a request is truly random, this can occur 50% of the time. If memory controller 220 is idle, or timing constraints allow, memory controller 220 will attempt to launch the leading packet for a request in the first available empty slot towards packet driving logic 450 to minimize latency.

Figure 5A:
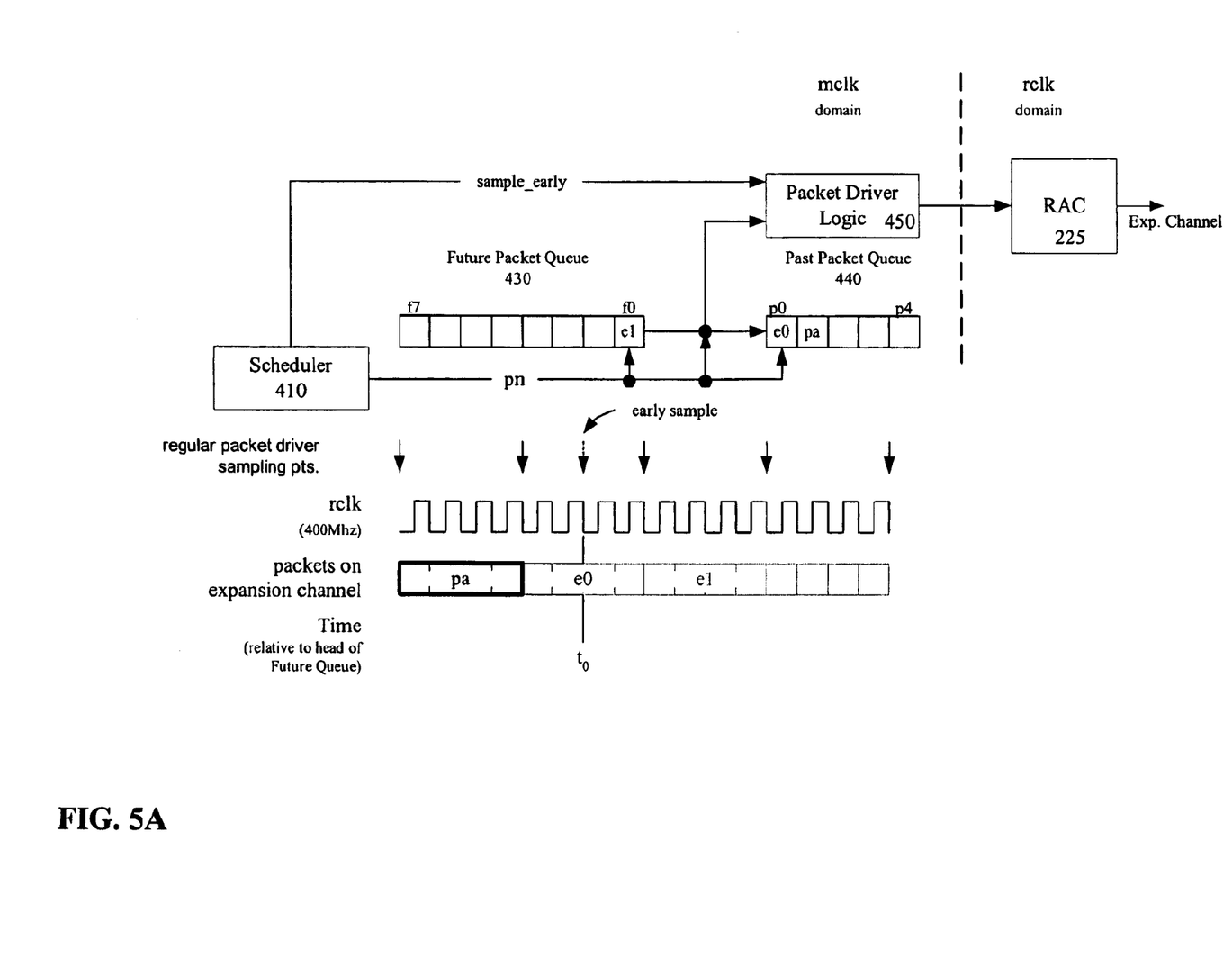
FIGS. 5A–5D illustrate an early launch, idle case sequence implemented by a modified slot-based controller.

Referring to FIG. 5A, the launch point at time t0 is shown. A packet "pa" is stored in the second location of past queue 440, having previously been scheduled. In addition, the next two packet slots (slot f0 of queue 430 and p0 of queue 440) are empty. Scheduler 410 has a new packet that rules checker 420 indicates could go into either empty slot. Packet driver logic 450 has already completed a sampling of a first empty packet "e0", as half of the e0 packet has already been transmitted out on the expansion channel. Scheduler 410 indicates an early launch of its new packet "pn" and signals packet driver logic 450 to sample early. The new packet pn is presented to packet driver logic 450 directly and written into the head of future queue 430 and the tail of past queue 440 simultaneously.

Figure 5B:
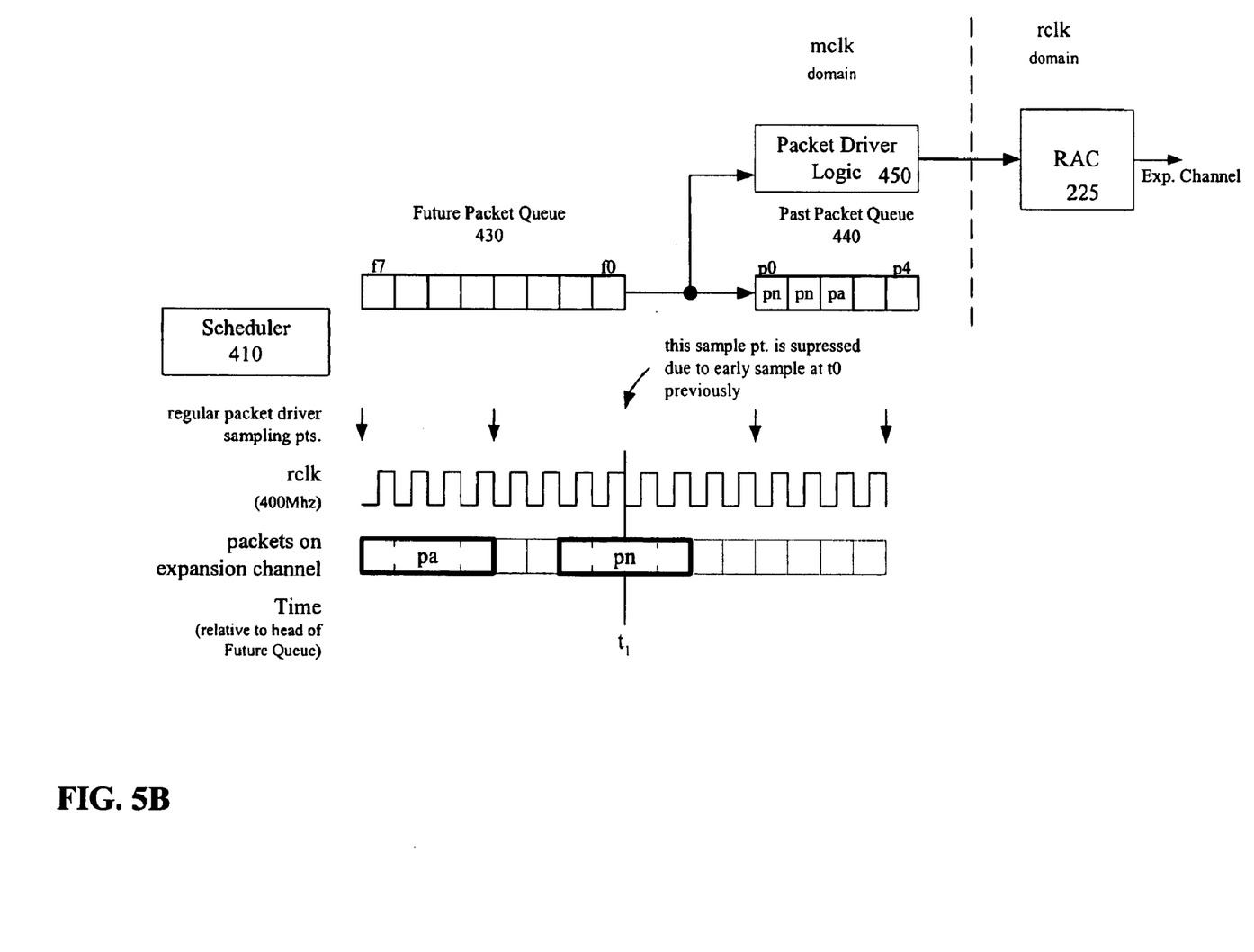

Referring to FIG. 5B, future queue 430 and past queue 440 have shifted forward with the time advance from t0 to t1. The first two entries of past queue 440 both indicate packet pn, which is straddling both slots on the expansion channel. The regular packet driver logic 450 sampling point at t1 has been suppressed because of the previous early sampling. This prevents the last half of packet 'pn' that is still in the packet driver logic from being overwritten.

Figure 5C:
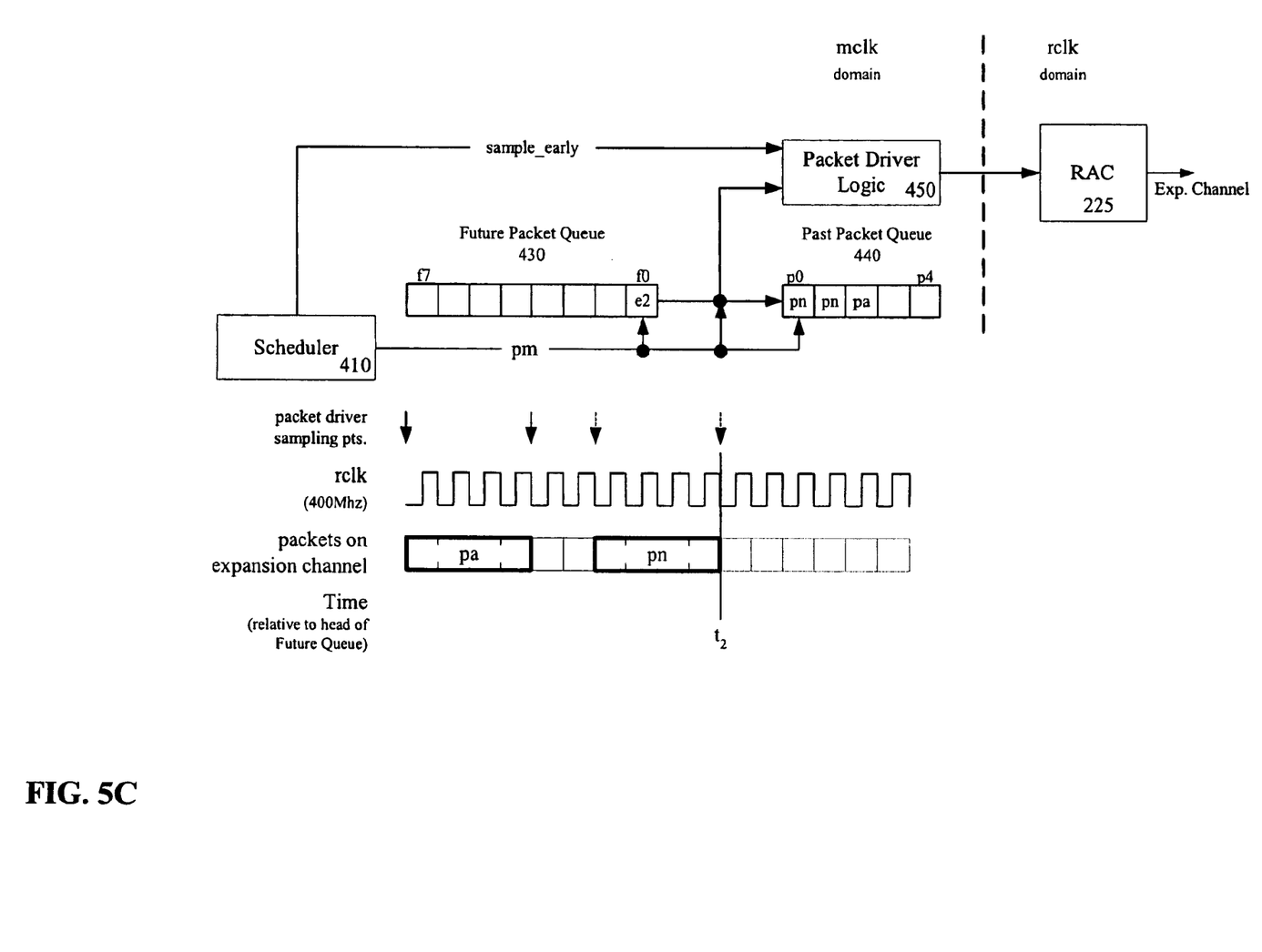

Referring to FIG. 5C, there is a previous packet pn that is already straddling two regular queue slots, and a new memory request has arrived at the input of scheduler 450. The optimal packet placement is directly behind the previous early packet, which implies this packet could be early as well. Rules checker 420 detects that the partially committed slot in the tail entry of past queue 440 is occupied by packet pn, but that pn is only occupying the last half of the slot. Rules checker 420 further determines that a new packet "pm" will not violate timing, or ordering constraints, if placed in the f0 or p0 packet slots. Therefore, the new 'pm' packet can also be launched early.

Figure 5D:
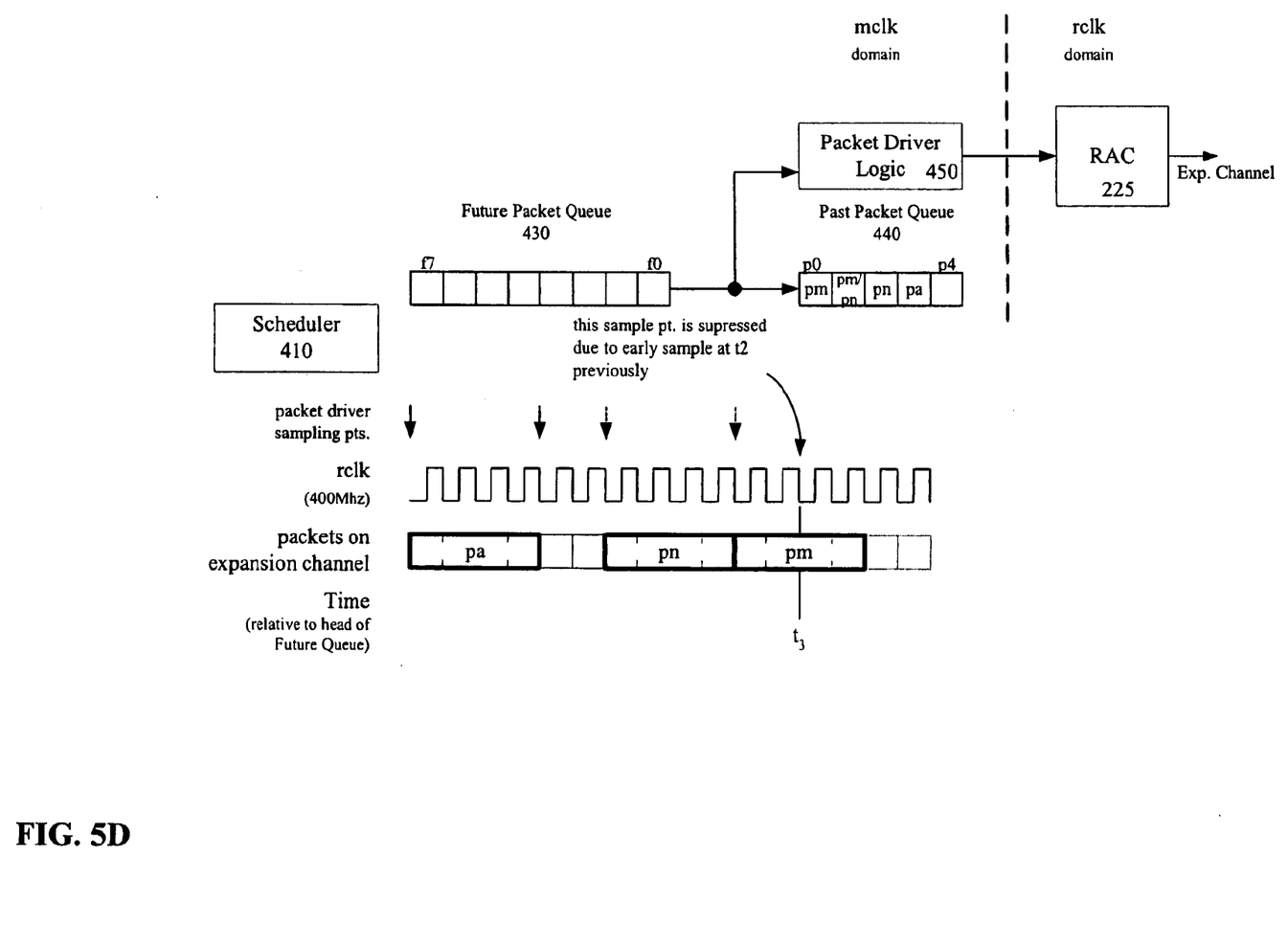

Referring to FIG. 5D, with the time advance from t2, future queue 430 and past queue 440 have shifted forward. The first two entries of past queue 440 both indicate packet pm, which is straddling both slots on the RQ bus. The regular packet driver logic 450 sampling point at t3 has been suppressed because of the previous early sampling. This prevents the last half of packet pm that is still in the packet driver logic from being overwritten. Note also that past queue 440 slot p1 is marked as containing both the pm and pn packets. Packet pm is occupying the last half of this slot while packet pn is occupying the first half.

Figure 6A:
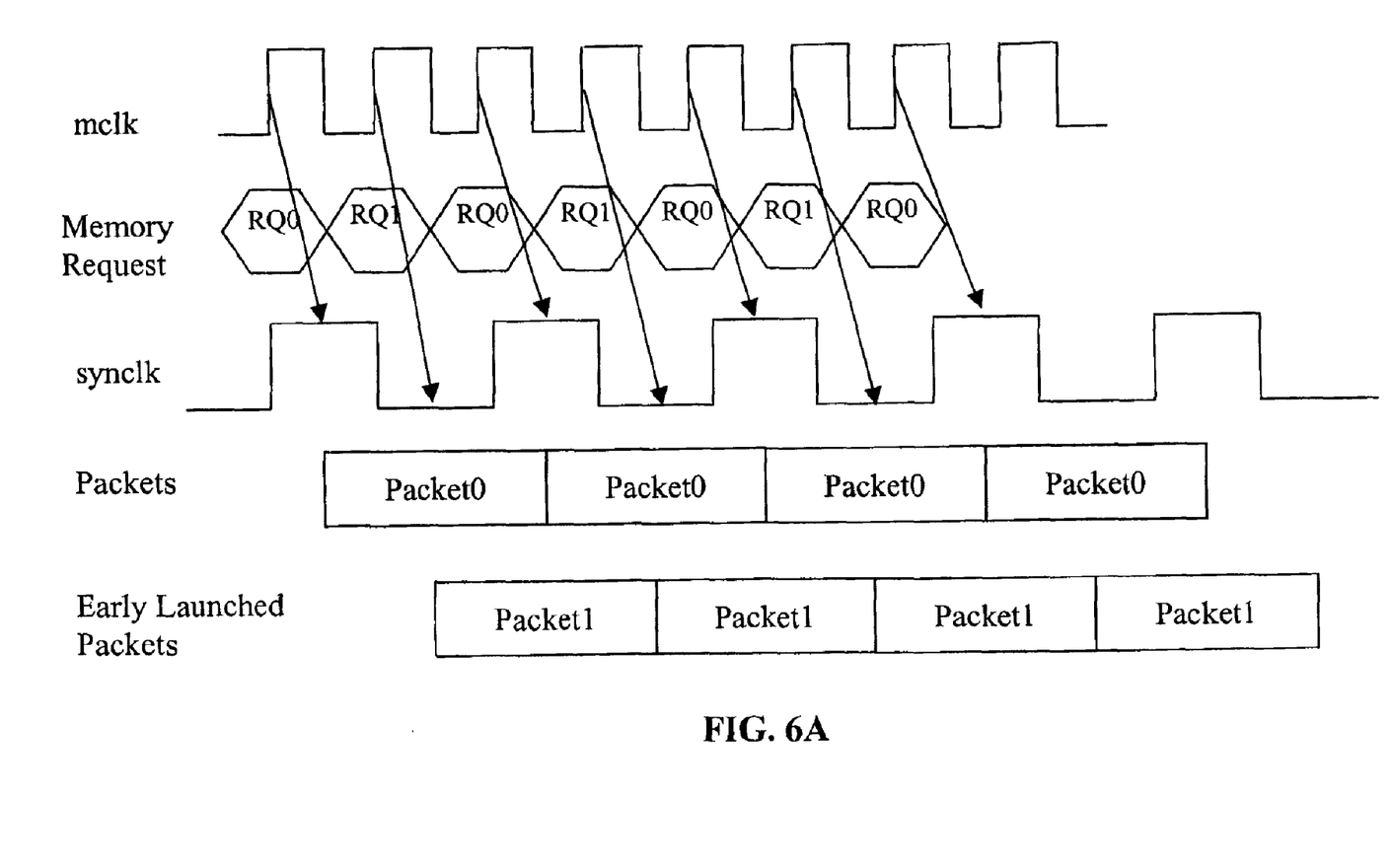
FIGS. 6A–6B are timing diagrams for various embodiments of a modified slot-based system.

FIG. 6A is a timing diagram for one embodiment of a modified slot-based system wherein the ratio of mclk to synclk is 2:1. In this embodiment, an additional idle launch point is possible for each memory request. Therefore, for every mclk-based memory request, a leading packet can be launched early for each of the two mclks within the synclk and mclk beat period. Note that the average latency difference between the modified slot scheduler in this embodiment and the exemplary slot-based scheduler illustrated in FIG. 3A is 0.25 synclks. As a result there is an average savings of 2.5 ns for a 100 Mhz synclk for each idle memory request.

Figure 6B:
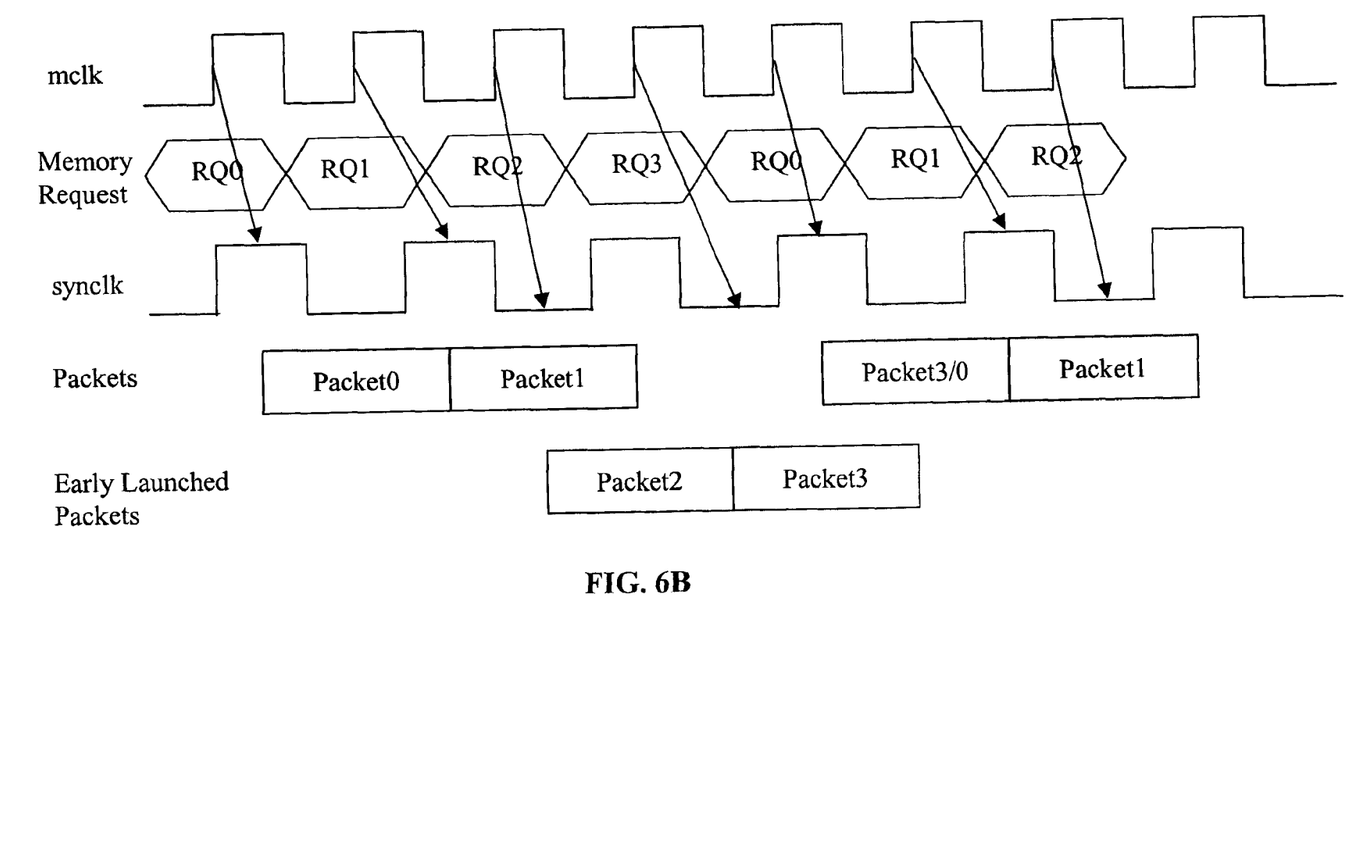

FIG. 6B is a timing diagram for one embodiment of a modified slot-based system wherein the ratio of mclk to synclk is 4:3. As illustrated above, an additional idle launch point is possible ½ synclk earlier for memory requests 2 and 3 only (e.g., 2 out of the 4 potential memory requests within the synclk:mclk beat period). Note that the average idle latency difference between the modified slot scheduler in this embodiment and the exemplary slot-based scheduler illustrated in FIG. 3B is also 0.25 synclks (e.g., 2.5 ns for a 100 Mhz synclk).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

Thus, a mechanism for reducing the idle memory read leadoff latency of a skewed slot-based Rambus memory controller has been described.

What is claimed is:

1. A computer system comprising:
   a main memory device; and
   a memory controller, coupled to the main memory device, including:
      a first queue to store packets that are to be transmitted from the memory controller to the main memory device;
      a scheduler to launch a first packet from the first queue that straddles a first fixed packet slot and a second fixed packet slot, wherein the first packet is tagged with an attribute that indicates that the packet is straddling the first fixed packet slot and the second fixed packet slot.

2. The computer system of claim 1 wherein the launch position of the first packet is advanced one half of a slot position relative to the second fixed packet slot.

3. The computer system of claim 1 wherein the attribute is a Rambus clock offset.

4. The computer system of claim 1 wherein the first packet is a Rambus control packet.

5. The computer system of claim 1 wherein the memory controller further comprises a Rambus Asic Cell (RAC) to interface with the main memory device via a high frequency expansion channel.

6. The computer system of claim 5 wherein the memory controller further comprises:
   a rules checker coupled to the scheduler; and
   a second queue coupled to the first queue, the scheduler and the rules checker.

7. The computer system of claim 6 wherein the rules checker uses entries in the second queue to validate future slot choices for the scheduler.

8. The computer system of claim 6 wherein the second queue and the first queue are unidirectional shift registers.

9. The computer system of claim 6 wherein the memory controller further comprises packet driving logic coupled to the RAC and the scheduler to interface with the RAC.

10. The computer system of claim 5 wherein the memory controller further comprises:
    an expansion channel coupled to the RAC.

11. The computer system of claim 10 wherein the main memory device comprises:
   a repeater coupled to the expansion channel;
   a stick channel coupled to the repeater; and
   a plurality of memory devices coupled to the stick channel.

12. The computer system of claim 11 wherein the memory devices are Rambus Dynamic Random Access Memories (RDRAMs).

13. The computer system of claim 10 further comprising a plurality of memory devices coupled to the expansion channel.

14. A memory controller comprising:
   a first queue to store packets that are to be transmitted from the memory controller to the main memory device;
   a scheduler to launch a first packet from the first queue that straddles a first fixed packet slot and a second fixed packet slot, wherein the first packet is tagged with an attribute that indicates that the first packet is straddling the first fixed packet slot and the second fixed packet slot.

15. The memory controller of claim 14 wherein the first packet launch position is advanced one half of a slot position relative second fixed packet slot.

16. The memory controller of claim 14 wherein the attribute is a Rambus clock offset.

17. The memory controller of claim 14 wherein the first packet is a Rambus control packet.

18. The memory controller of claim 14 further comprising a Rambus Asic Cell (RAC) to interface with a main memory device via a high frequency expansion channel.

19. The memory controller of claim 18 wherein the slot-based controller comprises:
   a rules checker coupled to the scheduler; and
   a second queue coupled to the first queue, the scheduler and the rules checker.

20. The memory controller of claim 19 wherein the rules checker uses entries in the second queue to validate future slot choices for the scheduler.

21. The memory controller of claim 19 wherein the second and the first queue are unidirectional shift registers.

22. The memory controller of claim 19 wherein the slot-based controller further comprises packet driving logic coupled to the RAC and the scheduler.

23. A method comprising:
   retrieving a first packet from a packet queue; and
   transmitting the first packet to a memory, wherein the first packet is transmitted straddling a first fixed packet slot and a second fixed packet slot, and tagging the first packet with an attribute that indicates that the packet is straddling the first fixed packet slot and the second fixed packet slot.

24. The method of claim 23 further comprising advancing the launch position of the first packet one half of a slot position relative to the second fixed packet slot.

25. The method of claim 23 further comprising accessing a second queue to track previously transmitted packets.

* * * * *

UNITED STATES PATENT AND TRADEMARK OFFICE
CERTIFICATE OF CORRECTION

| | |
|---|---|
| PATENT NO. | : 6,940,816 B2 |
| DATED | : September 6, 2005 |
| INVENTOR(S) | : McDonnell |

It is certified that error appears in the above-identified patent and that said Letters Patent is hereby corrected as shown below:

<u>Column 2,</u>
Line 27, delete "10" and insert -- 110 --.

Signed and Sealed this

Twenty-second Day of November, 2005

JON W. DUDAS
*Director of the United States Patent and Trademark Office*